United States Patent [19]

Kazama

[11] 4,014,596
[45] Mar. 29, 1977

[54] SELF-CENTERABLE BEARING
[75] Inventor: Hachiro Kazama, Tokyo, Japan
[73] Assignee: Kabushikikaisha Ochiai Seisakusho, Tokyo, Japan
[22] Filed: Sept. 30, 1975
[21] Appl. No.: 618,230
[30] Foreign Application Priority Data
  Jan. 29, 1975  Japan ............................. 50-12702
[52] U.S. Cl. ................. 308/72; 308/36 R; 308/187
[51] Int. Cl.² ..................... F16C 9/06; F16C 23/00
[58] Field of Search ................ 308/72, 36, 194, 78, 308/207 R, 187

[56] References Cited
UNITED STATES PATENTS
3,224,821  12/1965  Barr .................................. 308/194

Primary Examiner—Joseph F. Peters
Assistant Examiner—Richard A. Bertsch
Attorney, Agent, or Firm—Holman & Stern

[57] ABSTRACT

A self-centerable bearing retaining a spherical, porous bearing between a metal receiving and metal pressing plate in which the plates are integrally connected by a binder; one side of the spherical surface of the bearing being received in a corresponding portion of the metal receiving plate and an annular pressing and supporting portion of the pressing plate loosely receiving a spherical portion of the bearing, the annular pressing and supporting portion including a plurality of projections engaged in a plurality of corresponding grooves on the bearing, an annular flange portion on the inner peripheral surface of the pressing plate including projections engaged in a plurality of sloped recesses on a peripheral edge of the metal pressing plate.

3 Claims, 6 Drawing Figures

SELF-CENTERABLE BEARING

BACKGROUND OF THE INVENTION

1. Field of the Invention

This invention relates to self-centerable bearings to be used in a bearing part of a rotary shaft of a light load.

2. Description of the Prior Art

There is already known a bearing of a small shaft diameter less than 12mm. of a rotary shaft or rotary mechanism part of a light load part mostly in a power transmitting mechanism, wherein generally a spherical bearing metal made of a sintered alloy is held with a receiving plate and a pressing and supporting plate made of a resilient material so as to be centered. In such formation, there are such disadvantages that, as a spring pressure is applied to the bearing metal made of a sintered alloy, the centerability will reduce, that, in the case that a large force acts instantaneously on a rotary shaft or a partial load acts normally on a shaft as in a winding power transmission by using a belt, the resilient pressure applied to the spherical surface of the bearing metal will be unbalanced, the bearing metal will be likely to be pushed and moved in the direction of the action of the force and the shaft will be non-smoothly supported and that, in order that a proper centerability may be produced, respectively made pressing plates different in the resiliency must be used in response to the sizes of the loads applied to the rotary shaft.

SUMMARY OF THE INVENTION

The present invention is created to eliminate such defects as are mentioned above of conventional self-centerable bearings of this kind.

BRIEF DESCRIPTION OF THE DRAWINGS

The drawings show an embodiment of the present invention.

DESCRIPTION OF THE PREFERRED EMBODIMENTS

Figure 1:
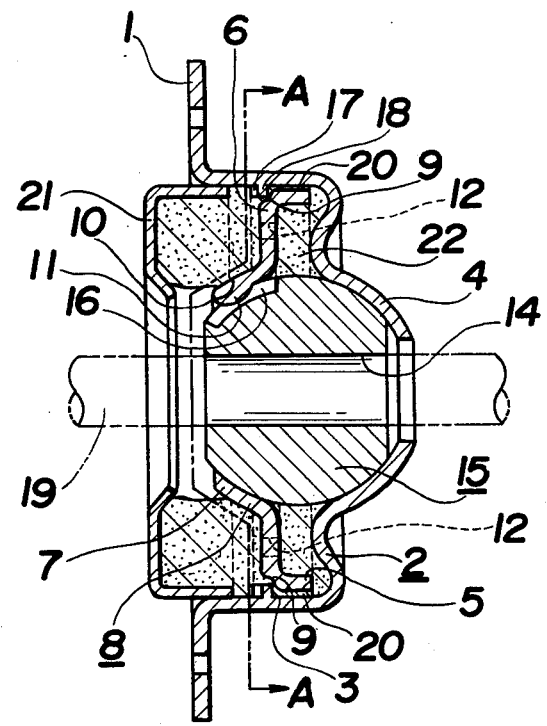
FIG. 1 is a vertically sectioned side view.

The present invention shall be explained more particularly with reference to the drawings.

A metal receiving part 4 of an arcuate section is formed in the center of a fitting part 3 of a metal receiving plate 2 provided with a flange part 1, on the other hand, a peripheral wall part 5 loosely fitting the fitting part 3 of the above mentioned metal receiving plate 2 is provided on the peripheral edge 6 and a metal pressing plate 8 provided in the center with an annular pressing and supporting part 7 of an arcuate section corresponding to the above mentioned metal receiving part 4 is formed.

The above mentioned metal pressing plate 8 has a plurality of sloped recesses 9 formed at regular intervals or continuously on the peripheral edge 6, has a plurality of engaging projections 11 provided to project at regular intervals inside the inner peripheral edge 10 of the annular pressing and supporting part 7 and has a plurality of communicating holes 12 made between the annular pressing and supporting part 7 and peripheral edge 6.

A spherical surface 13 fitting the inner surfaces of the above mentioned metal receiving part 4 and annular pressing and supporting part 7 is made of a sintered alloy or a porous metal of the same effect, a bearing metal 15 provided with a shaft hole 14 is formed and engaging grooves 16 with which the above mentioned engaging projections 11 are to engage are formed on the half part of the spherical surface 13 of said bearing metal 15 so as to be in the same number and positions as of the engaging projections and in the same direction as of the center line of the shaft hole 14.

Figure 2:
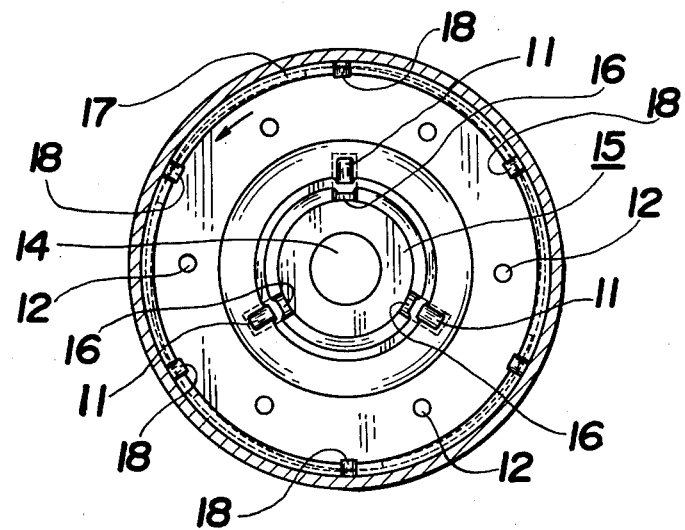
FIG. 2 is a rear view of the same vertically sectioned on A — A.
Figure 3:
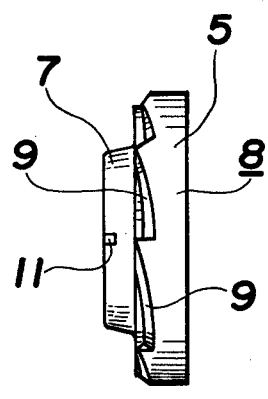
FIG. 3 is a side view of a metal pressing plate.
Figure 4:
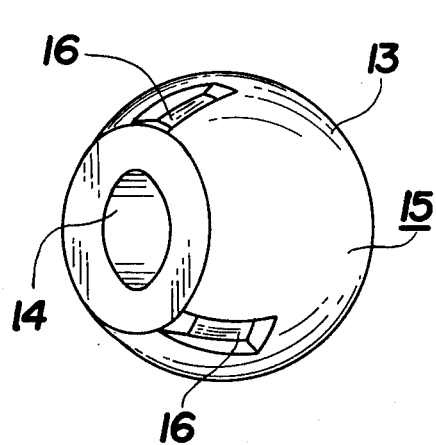
FIG. 4 is a perspective view of a bearing metal.
Figure 5:
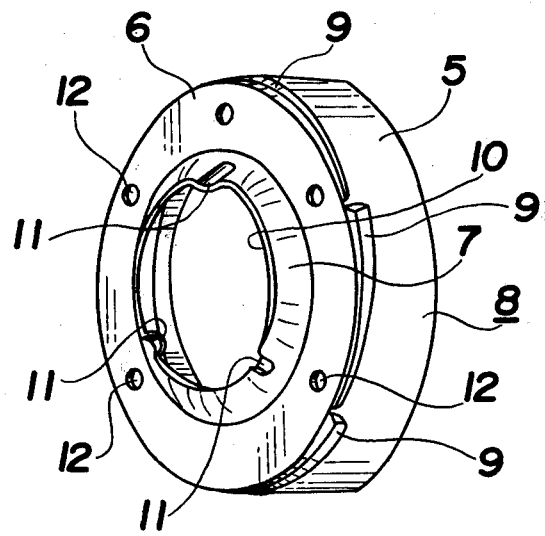
FIG. 5 is a perspective view of the metal pressing plate.
Figure 6:
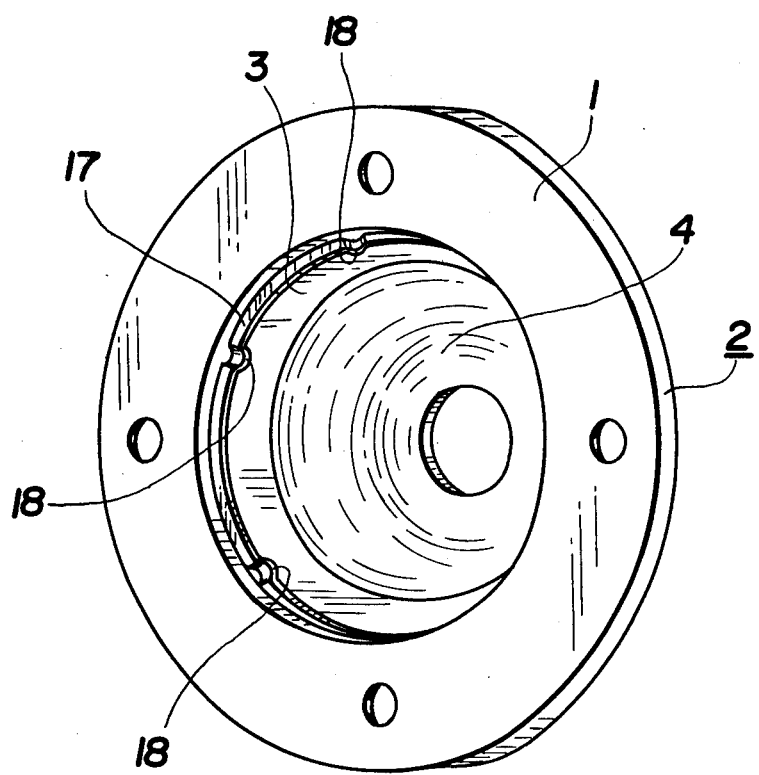
FIG. 6 is a perspective view of a metal receiving plate.

The peripheral surface on one side (right in the drawing) of the above mentioned bearing metal 15 is kept in contact with the inner surface of the metal receiving part 4 of the above mentioned metal receiving plate, at the same time, the annular pressing and supporting part 7 of the metal pressing plate 8 having the peripheral wall part 5 loosely fitted to the fitting part 3 of the metal receiving plate 2 is kept in contact with the peripheral surface on the other side (left in the drawing) of the bearing metal 15 and the engaging projections 11 on the inner peripheral edge 10 of said annular pressing and supporting part 7 are inserted in the engaging grooves 16 on the bearing metal 15. An annular flange part 17 pressed out and formed on the inner periphery of the above mentioned fitting part 3 is fitted on the peripheral edge 6 of the metal pressing plate 8 having the peripheral wall part 5 loosely fitted to the fitting part 3 of the metal receiving plate 2 as mentioned above and, further, as many engaging projections 18 engaging with the sloped recesses 9 on the peripheral edge 6 of the metal pressing plate 8 as the sloped recesses are formed on said annular flange part 17 so that, when the metal pressing plate 8 is rotated in the normal direction (the direction indicated by the arrow in FIG. 2), it may be strongly brought into contact with the bearing metal 15 or, when the metal pressing plate 8 is rotated in the direction reverse to that mentioned above, it may be lightly brought into contact with the bearing metal 15 and that thus, by rotating the metal pressing plate 8 in the normal or reverse direction, the bearing metal 15 may be held tightly or loosely adjustably between the annular pressing and supporting part 7 of the metal pressing plate 8 and the metal receiving part 4 of the metal receiving plate 2.

In response to the size of the load applied to the rotary shaft 19 passed through and supported by the shaft hole 14 in the above mentioned bearing metal 15, the metal pressing plate 8 is properly rotated to freely adjust the hold of the bearing metal 15 with the above mentioned annular pressing and supporting part 7 and metal receiving part 4 to be strong or weak and to keep the holding state proper to have a centerability adapted to the load and then the clearance between the peripheral wall part 5 of the metal pressing plate 8 and the fitting part 3 of the metal receiving plate 2 is filled with a binder 20 to integrally fix the metal pressing plate 8 to the metal receiving plate 2.

Further, an annular oil recovering lid 21 is positioned outside the above mentioned metal pressing plate 8 and is fitted to the fitting part 3 of the metal receiving plate 2 and fibers or oil retaining materials 22 of the same effect impregnated with a lubricating oil are set respectively between the inner surface of said oil recoverlid 21 and the metal pressing plate 8 and between the inner surface of the metal pressing plate 8 communicating with the inner surface of the oil recovering lid 21 through communicating holes 12 in the metal pressing plate 8 and the inner surface of the metal receiving plate 2 so that the oil retaining material 22 may be in contact with the bearing metal 15.

As the present invention is formed as mentioned above, by fitting the peripheral surface on one side of the bearing metal 15 formed to be of a spherical surface 13 and made of a sintered alloy or a porous metal of the same effect to the inner surface of the metal receiving part 4 of the metal receiving plate 2 and then fitting the annular pressing and supporting part 7 of the metal pressing plate 8 having the peripheral wall part 5 loosely fitted to the fitting part 3 of the metal receiving plate 2 to the peripheral surface on the other side of the bearing metal 15, the bearing metal 15 can be easily held between the metal receiving plate 2 and metal pressing plate 8 so as to be rotatable, that is, centerable. Further, by engaging the plurality of engaging projections 11 provided to project at regular intervals on the inner peripheral edge 10 of the above mentioned annular pressing and supporting part 7 with the engaging grooves 16 made on the bearing metal 15, the bearing metal 15 can be prevented from rotating together with the rotary shaft 19 and can be properly self-centered in conformity with the inclined movement of the rotary shaft 19 within a range limited by the plurality of the engaging grooves 16. A plurality of slowly sloped recesses 9 are formed on the peripheral edge 6 of the metal pressing plate 8 in the present invention, the engaging projections 18 formed on the annular flange part 17 of the fitting part 3 of the metal receiving plate 2 engaged on the above mentioned peripheral edge 6 are engaged with said recesses 9, therefore, by normally or reversely rotating the metal pressing plate 8 without using any special pressing pressure adjusting tool in response to the size of the load applied to the rotary shaft 19 passed through the shaft hole 14 in the bearing metal 15, the metal pressing plate 8 can be brought into contact freely strongly or weakly with the peripheral surface of the bearing metal 15 by slightly moving forward or rearward the metal pressing plate 8 with respect to the bearing metal 15, the centerability can be properly adjusted so that the centering operation may be heavy when the load applied to the rotary shaft 19 is large but may be light when the load is small and, soon after the adjustment, the clearance between the peripheral wall part 5 of the metal pressing plate 8 and the fitting part 3 of the metal receiving plate 2 is filled with a binder 20 to integrally fix the metal receiving plate 2 to the metal pressing plate 8 and thus a bearing centerable in response to the size of the load carried by the rotary shaft can be easily obtained. By the annular pressing and supporting part 7 of the metal pressing plate 8 and the metal receiving part 4 of the metal receiving plate 2 bonded and combined integrally with each other as mentioned above, the bearing metal 15 is securely held in an arcuate contact state, a smooth centerability is maintained and, even if a partial load acts on the rotary shaft 19, the bearing metal 15 will be prevented by the metal pressing plate 8 from being unnecessarily pushed and moved in the direction of the action of the force, will be held in the normal position and will well develop its function.

Further, by forming a plurality of engaging grooves 16 on the spherical surface 13 of the bearing metal 15 and loosely engaging the engaging projections 11 formed on the annular pressing and supporting part 7 of the metal pressing plate 8 with said engaging grooves 16 as shown in the embodiment of the present invention, the rotation of the bearing metal 15 can be prevented, the pumping action of the rotary shaft 19 can be kept and the feed of the lubricating oil to the rotary shaft 19 from the oil retaining materials 22 through the bearing metal 15 made of a porous metal can be smoothly held, the air passage to the outside from the sealed part of the bearing metal 15 through the engaging grooves 16 can be made easy and the lubricating oil can be prevented from jetting out with the variation of the atmospheric pressure caused by the temperature difference between inside and outside.

In short, in the present invention, in a bearing in which a bearing metal is centerably held between a metal receiving plate and metal pressing plate combined integrally with each other through a binder, the peripheral surface on one side of the bearing metal 15 made of a porous metal is fitted to a metal receiving part 4 formed in the center of a fitting part 3 of the metal receiving plate 2, an annular pressing and supporting part 7 of a metal pressing plate 8 having the peripheral wall part 5 loosely fitted to the above mentioned fitting part 3 is fitted to the peripheral surface on the other side of said bearing metal 15, a plurality of engaging projections 11 provided on the inner peripheral edge 10 of said annular pressing and supporting part 7 are engaged with a plurality of engaging grooves 16 formed on the bearing metal 15, an annular flange part 17 pressed out and formed on the inner peripheral surface is engaged with the peripheral edge of the metal pressing plate 8, a plurality of engaging projections 18 formed on said annular flange part 17 are engaged with a plurality of sloped recesses 9 provided on the peripheral edge 6 of the above mentioned metal pressing plate 8, the metal pressing plate 8 is brought into contact freely strongly or weakly with the bearing metal 15 by normally or reversely rotating the metal pressing plate 8 and the bearing metal 15 is held slowly or quickly adjustably between the annular pressing and supporting part 7 of the metal pressing plate and the metal receiving part 4 of the metal receiving plate 2 so that, by adjustably contacting the annular pressing and supporting part 7 of the metal pressing plate freely strongly or weakly with the bearing metal 15 by rotating the metal pressing plate normally or reversely in response to the size of the load applied to the rotary shaft 19 passed through the shaft hole 14 in the bearing metal 15, the centering operation may be made heavy in response to a large load and may be made light in response to a small load and such adjustment may be easily made without using any special pressing pressure adjusting tool, then the clearance between the peripheral wall part 5 of the metal pressing plate 8 and the fitting part 3 of the metal receiving plate 2 is filled with a binder 20 so that the metal receiving plate 2 may be fixed integrally to the metal pressing plate 8 and thus a bearing self-centerable in response to the size of the load can be easily obtained.

Further, as a plurality of engaging projections 11 provided on the annular pressing and supporting part 7 of the metal pressing plate 8 are inserted in a plurality of engaging grooves 16 formed on the surface of the bearing metal 15, the rotation of the bearing metal 15 can be prevented, the pumping action of the rotary shaft 19 can be kept, the feed of the lubricating oil to the rotary shaft 19 from the oil retaining materials 22 through the bearing metal 15 made of a porous metal can be obtained smoothly, the air passage to the outside from the sealed holding part of the bearing metal through the engaging grooves 16 can be made easy, the lubricating oil can be prevented from jetting out with variation of the atmospheric pressure caused by the temperature difference between inside and outside and a proper centering action can be smoothly carried out within a range limited by the plurality of engaging grooves 16.

What is claimed is:

1. A self-centering bearing assembly including a housing and a pressure plate connected together by a binder means and receiving a single spherical bearing of porous material, the bearing being held by a spherical section of a receiving portion of the housing and an annular supporting portion of the pressure plate, the annular supporting portion having a peripheral wall loosely fitted to the receiving portion of the housing, a plurality of projections on the annular supporting portion engageable with a corresponding plurality of grooves on the spherical bearing, the receiving portion having an annular flange engageable with the peripheral edge of the pressure plate, and a plurality of projections on the annular flange engageable with a plurality of inclined recesses provided on the peripheral edge of the pressure plate.

2. An assembly according to claim 1, in which the binder means is disposed in a clearance between the peripheral wall of the pressure plate and the receiving portion of the housing to integrally connect the pressure plate with the housing.

3. An assembly according to claim 1, in which an annular oil retaining cover is fitted onto the housing and is positioned on the outside of the pressure plate, and oil retaining materials impregnated with a lubricating oil are disposed between the inner surface of the oil retaining cover and pressure plate and between the inner surface of the pressure plate and the inner surface of the housing.

* * * * *